May 16, 1967     J. V. KUSSMAN     3,319,599
ROSARY GUIDE

Filed May 8, 1964     4 Sheets-Sheet 1

INVENTOR.
JOAN V. KUSSMAN,
BY Yungblut, Melville, Strasser & Foster
ATTORNEYS.

INVENTOR.
JOAN V. KUSSMAN,
BY
ATTORNEYS.

May 16, 1967  J. V. KUSSMAN  3,319,599
ROSARY GUIDE

Filed May 8, 1964

INVENTOR.
JOAN V. KUSSMAN,
BY
ATTORNEYS.

United States Patent Office 3,319,599
Patented May 16, 1967

3,319,599
ROSARY GUIDE
Joan V. Kussman, 775 Danvers Drive,
Cincinnati, Ohio 45240
Filed May 8, 1964, Ser. No. 365,887
5 Claims. (Cl. 116—133)

This invention relates to a prayer reading device and has to do more particularly with a rosary guide by means of which the worshiper may count or recall to mind and recite the series of prayers which comprise the rosary.

The rosary is a form of devotion to the Virgin Mary consisting of three Mysteries each of which is composed of five decades of Ave Marias, each of which is preceded by a Pater Noster and ended with a Gloria Patri. Usually the worshiper follows or counts the prayers of the rosary using a strand of beads as a guide, the strand of beads being arranged in decades of ten like beads each of which is preceded by a somewhat larger bead representing the Pater Noster. The strand of beads is held in the worshiper's hands with the fingers passing to successive beads as the prayers are recited.

There are, however, many occasions when a person desirous of saying the rosary prayers is unable to count or follow the prayers using the rosary beads. For example, a housewife might very well wish to meditate and say the rotary prayers while performing a household task, such as ironing, sewing, or washing dishes, all of which tasks preclude the use of the rosary beads. Similarly, there are many instances wherein a worshiper, due to injury or infirmity, is unable to handle the rosary beads.

A principal object of the instant invention is the provision of a rosary guide by means of which the user may count or follow the rosary prayers without resort to the use of the rosary beads.

A further object of the instant invention is the provision of a rosary guide consisting essentially of a holder adapted to be placed upright on a supporting surface, such as a table, shelf, or the like, or else hung on a wall or other similar support, the holder having a front face provided with a plurality of openings arranged to represent a decade of rosary prayers, the openings in the face of the holder coacting with printed indicia contained within the holder.

Still a further object of the invention is the provision of a rosary guide of the character described wherein the holder contains a rotatable disk bearing printed indicia representing each of the five decades or titles of each of the three Mysteries of the rosary prayers, which titles are selectively visible through one of the openings in the face of the holder upon rotation of the disk.

Still a further object of the instant invention is the provision of a rosary guide of the character described wherein the rotatable disk is color coded, and wherein a pair of color coded insert panels are provided which coact with the rotatable disk and with the other openings in the face of the holder to selectively present a selected decade of prayers which may be followed by the user.

The foregoing together with other objects of the invention which will appear hereinafter or which will be apparent upon a complete reading of this specification, are accomplished by that construction and arrangement of parts of which an exemplary embodiment shall now be described.

Reference is now made to the accompanying drawings wherein.

Figure 1:
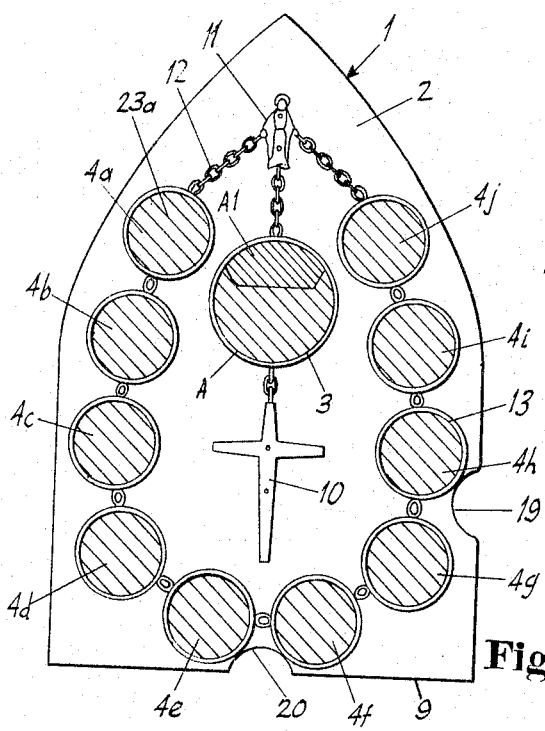
FIGURE 1 is a front elevational view of the holder.
Figure 2:
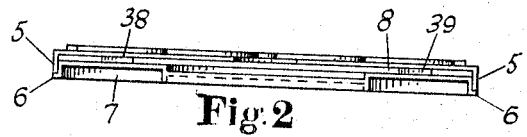
FIGURE 2 is an end elevational view of the holder taken from the lowermost end of FIGURE 1.

Referring first to FIGURE 1 of the drawings, the holder, indicated generally at 1, comprises a front face or cover 2 having a centrally disposed circular opening 3 therein which is surrounded by a series of ten smaller circular openings 4a through 4j. As will be explained more fully hereinafter, the opening 3 represents the Pater Noster and also serves to indicate the title of the particular Mystery being contemplated by the user, whereas the ten smaller openings 4a through 4j represent the ten Ave Marias in the particular decade of prayers. While the shape of the holder does not constitute a limitation on the invention, it is preferably of the configuration illustrated which represents a pointed arch. The cover has a depending flange 5 extending along its opposite side edges which, as possibly best seen in FIGURE 2, is adapted to seat against the outturned shoulder 6 forming a part of the base 7 which comprises the rear face of the holder. The depth of the flange 5 is such that it serves to space the front face of the cover upwardly from the base, thereby providing a shallow pocket 8 adapted to receive the color coded insert panels. In this connection the bottom edge 9 of the cover part 2 does not have a flange portion so that the pocket is exposed along the bottom edge of the holder.

Preferably both the cover part and the base of the holder will be molded from a suitable plastic material, and as an incident of the molding operation the cover and base parts may be suitably embossed. Thus, the cover part 2 may be so embossed as to represent a cross 10, a religious figure 11, and a chain 12 joining the various openings together in the representation of a strand of rosary beads. If desired, each of the openings 3 and 4a through 4j may beframed by embossed rings 13. Similarly, the base 7 may be suitably embossed to define reinforcing ribs 14 and lands 15, 15a and 15b which between them define a circular recess 16 in which the rotatable disk 17 is received, the disk 17 being rotatably attached at its center to the base 7 by means of pin 18.

The holder 1 is provided along one side edge with a cutout portion 19 in both the base and cover parts which permits the user to grasp the peripheral edge of the disk 17 so that it may be rotated; and in addition the cover part is provided with a cutout 20 by means of which the user may grip and remove the insert panels.

Figure 5:
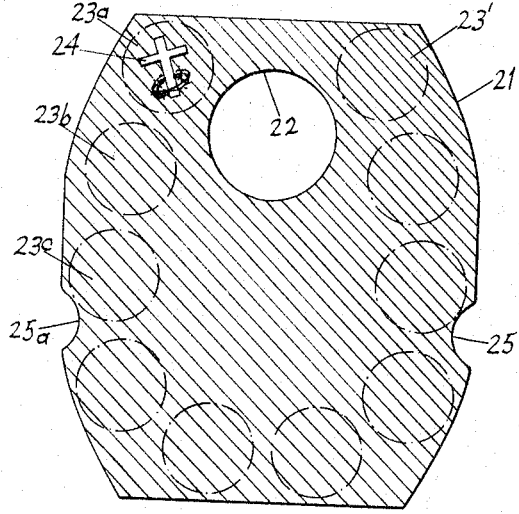
FIGURE 5 is a plan view of the front face of one of the color coded insert panels.
Figure 10:
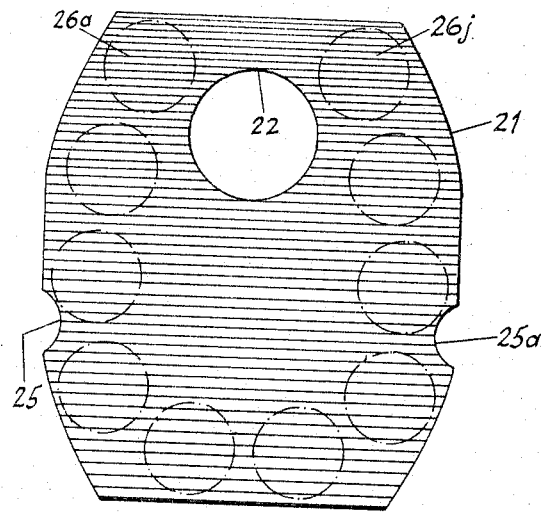
FIGURE 10 is a plan view of the rear face of the first of the color coded insert panels.

Referring now to FIGURE 5, the insert panel 21 is of a size to be received in the pocket 8 of the holder with the opening 22 in alignment with the opening 3. The front surface A of the insert panel will be color coded; and in the exemplary embodiment illustrated it is green. The circular areas 23a through 23j are adapted to coincide with the openings 4a through 4j, respectively, in the front face of the holder. The circles are for reference only and serve to indicate areas of the insert panel on which art work, symbolic of the particular decade of prayers, will be printed, such art work being indicated generally at 24. In addition, the insert panel 21 will be provided with a pair of cutouts 25, 25a adapted to selectively coincide with the cutout 19 in the holder. With reference to FIGURE 10, the rear surface B of insert panel 21 is color coded in a contrasting color, in this instance blue, with the circular areas 26a through 26j containing art work relating to the series of prayers represented by the blue side of the insert panel.

Figure 6:
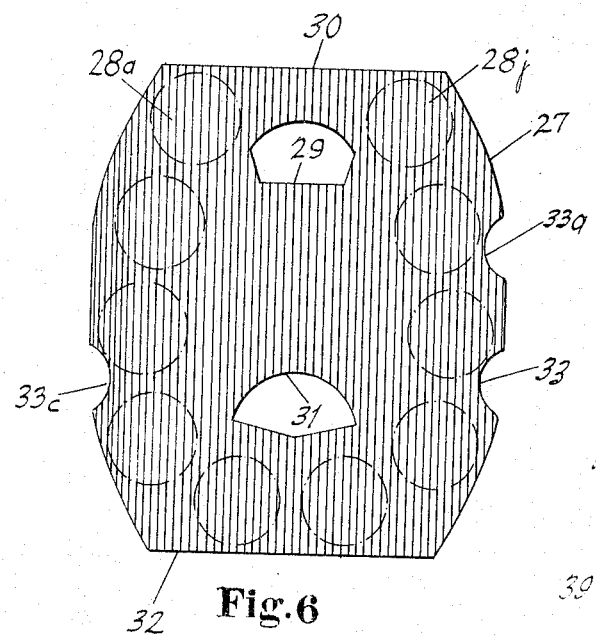
FIGURE 6 is a plan view of the front side of the other of the color coded insert panels.

Referring now to FIGURE 6, the second insert panel 27 has a front face C which is colored so as to contrast both with the surfaces A and B of insert panel 21. In the example given, the insert panel is pink; and as before the circular areas 28a through 28j are adapted to coincide with the openings 4a through 4j in the holder and will contain art work relating to the prayers represented by the colored face C of the insert panel. In addition, the insert panel is provided with a first cutout 29 positioned to coincide with the opening 3 in the holder when the edge 30 of the insert panel is uppermost in the holder. The insert has a second cutout 31 oriented to coincide with the opening 3 in the holder when the edge 32 of the insert panel is uppermost. The insert also has a set of cutouts 33, 33a and 33b adapted to selectively coincide with the cutout 19 in the holder depending upon which end of the insert panel is uppermost when inserted in the holder.

Figure 7:
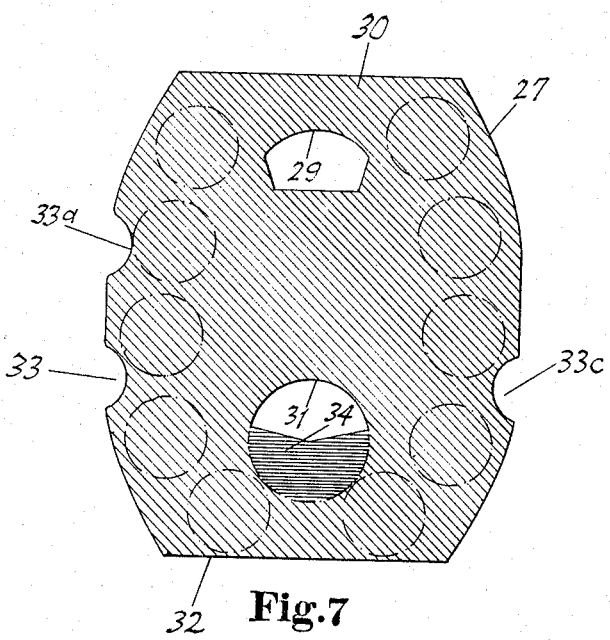
FIGURE 7 is a plan view of the rear side of the second of the color coded insert panels.

The rear face D of insert panel 27 is shown in FIGURE 7. It is also colored green, although the area 34 adjacent the cutout 31 will be colored blue. In this connection, it will be noted that the cutout area 31 and the colored area 34 define a circle corresponding in size to the opening 3 in the front face of the holder.

Figure 3:
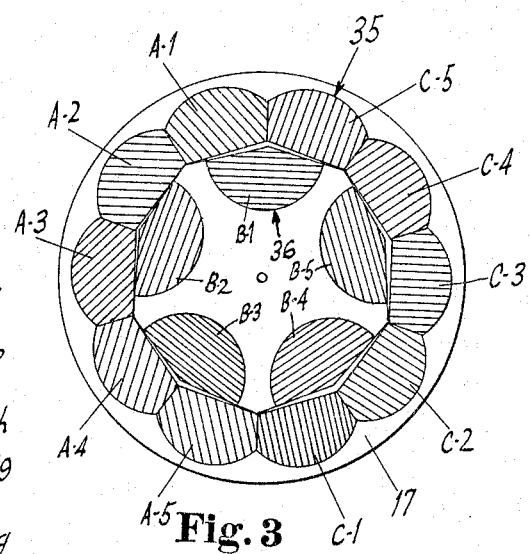
FIGURE 3 is a plan view of the color coded rotatable disk.

Turning now to FIGURE 3 which illustrates the rotatable disk 17, it will be seen that the disk has an outer band of printed indicia 35 comprising a first series of color coded areas A-1 through A-5 and a second series of contrasting color coded areas C-1 through C-5. These areas are positioned so as to selectively coincide with the opening 3 in the holder upon rotation of the disk, and it will also be noted that the configuration of the areas corresponds to the configuration of the opening 29 in insert panel 27. The areas A-1 through A-5 are colored green and, as will be explained in greater detail hereinafter, are adapted to coact with the like colored face A of insert panel 21 and face D of insert panel 27. The areas C-1 through C-5 are pink and will coact with face C of insert panel 27. In similar fashion, the disk 17 is provided with an inner band 36 of colored areas B-1 through B-5 which correspond in configuration to the opening 31 in insert 27 and are colored blue so as to correspond to the face B of insert panel 21 and the colored area 34 on the face D of insert 27.

Preferably, the insert panels 21 and 27 will be formed from paperboard which has been suitably printed to contain the desired color coding and accompanying printed indicia. If desired, such printed paperboard may be covered with a non-fibrous film, such as Mylar, to prevent soiling. It will be evident that the insert panels may be formed from other suitable material if so desired.

Figure 11:
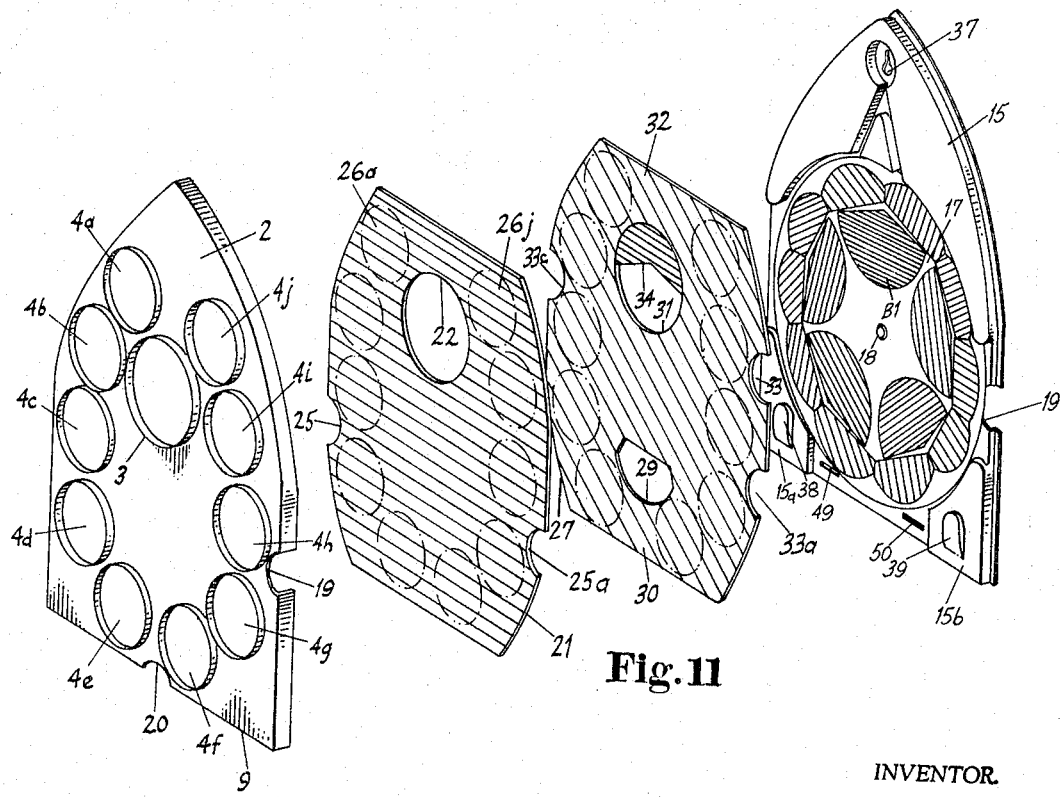
FIGURES 11, 12 and 13 are exploded perspective views illustrating the coaction of the various surfaces of the color coded insert panels to indicate the various series of prayers.
Figure 12:
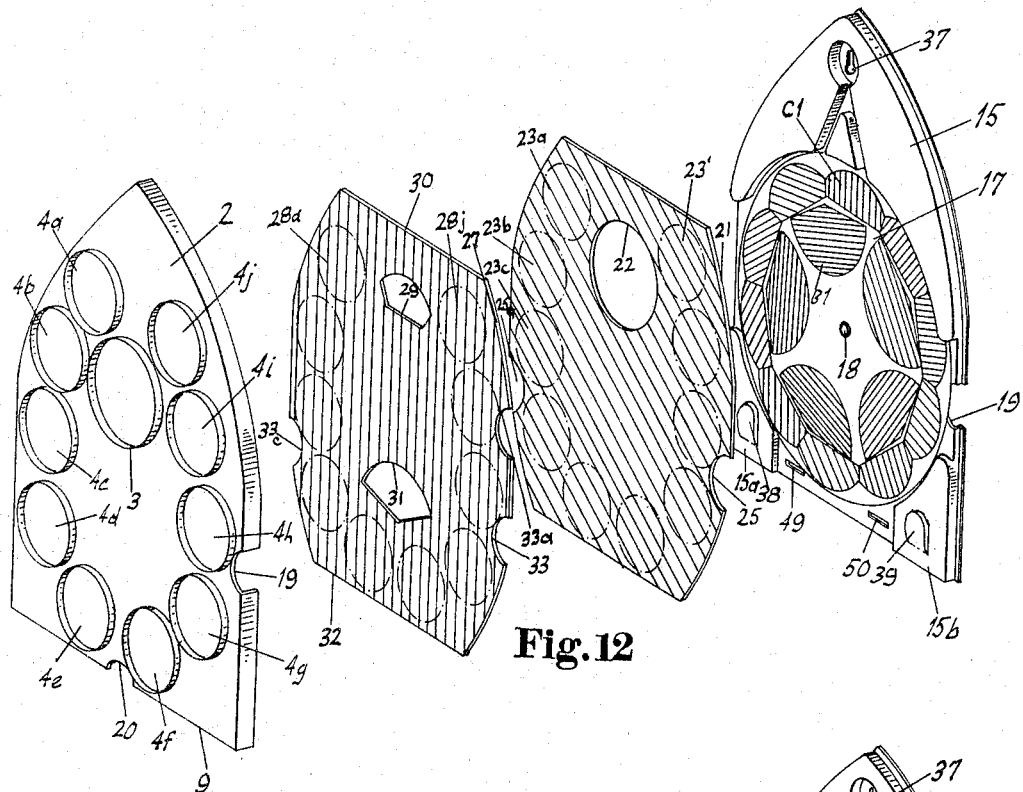
Figure 13:
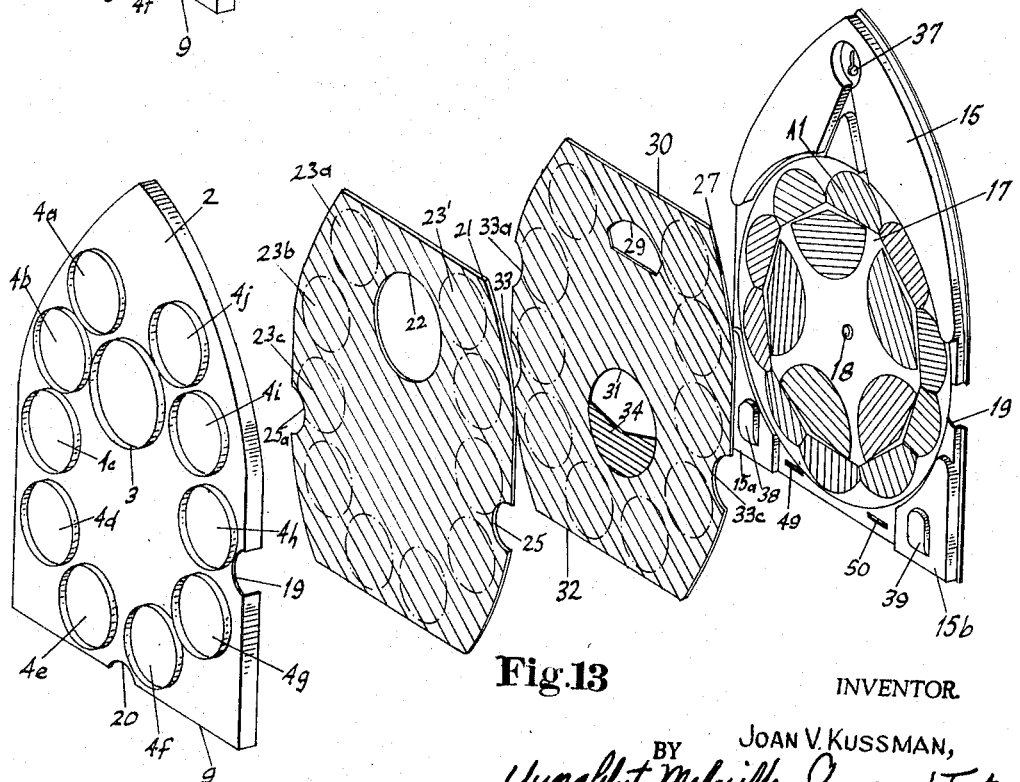

The manner in which the insert panels are employed to visually indicate the various series of prayers making up the rosary is illustrated in FIGURES 11, 12 and 13. Referring first to FIGURE 11, face B of insert panel 21 is inserted in the holder so as to lie adjacent the cover part 2. The face B which is color coded blue will be visible through the openings 4a through 4j and consequently the art work printed on the areas 26a through 26j will be visible to the viewer. The opening 22 in insert panel 21 overlies opening 3 in the holder and consequently exposes to view the opening 31 and colored area 34 of face D of the underlying insert panel 27. The opening 31 in turn exposes the corresponding colored areas B-1 through B-6 of underlying disk 17. Thus, only blue surfaces will be presented to the viewer through the openings 3 and 4a through 4j of the holder. The user may then rotate the disk 17 to selectively present the five areas B-1 through B-5 which will contain printed indicia indicating the five titles of the Mystery designated by the particular color, which in this instance is blue.

Referring now to FIGURE 12, it will be seen that the face C of insert 27 lies adjacent the cover part 2, with the edge 30 of the insert panel uppermost, thereby bringing opening 29 into alignment with opening 3 in the holder. Since the opening 29 occupies only a part of the opening 3, a portion of the face C will be visible through the remainder of opening 3; and the areas 28a through 28j will be visible through the openings 4a through 4j in the holder. Underlying insert panel 21, which may have either of its faces uppermost—the face A being shown uppermost in the illustration—has no effect on the combination since its opening 22 coincides with the opening 29 and hence serves to expose the areas C-1 through C-5 on underlying disk 17 since such areas are configured to coincide with the opening 29. Thus, all areas visible to the viewer are of like color, in this instance pink. As before, the areas C-1 through C-5 will bear printed indicia identifying the five titles of the particular Mystery designated by the visible color, which in this instance is pink.

Referring next to FIGURE 13, it will be seen that the face A of insert panel 21 is uppermost with the opening 22 coinciding with the opening 3 in the holder. Thus, the areas 23a through 23j are visible through openings 4a through 4j in the cover part of the holder. A portion of the underlying face D of insert panel 27, which is positioned with the edge 30 uppermost, is visible through opening 22, as is opening 29 which is positioned to overlie the areas A-1 through A-5 of the underlying disk 17. All areas now visible to the viewer are green and hence the viewer can follow the series of prayers pertaining to the Mystery identified by the color green.

Figure 4:
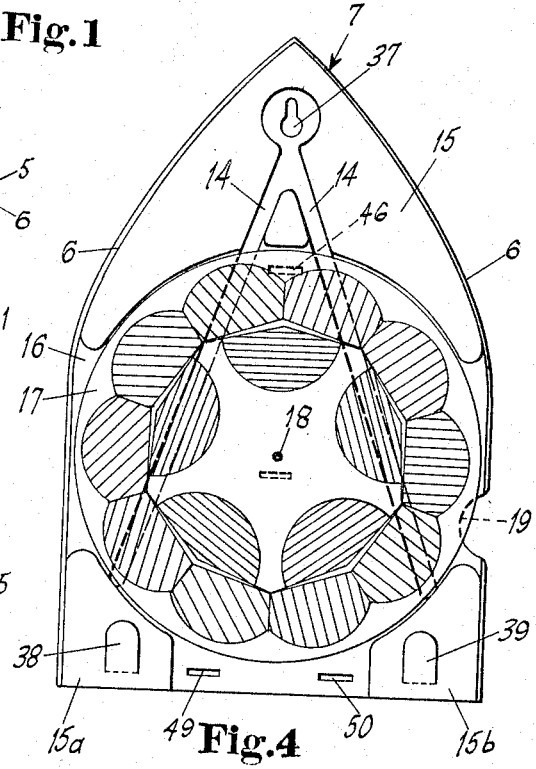
FIGURE 4 is a plan view of the holder with the cover removed illustrating the manner in which the rotatable disk is mounted to the base of the holder.
Figure 9:
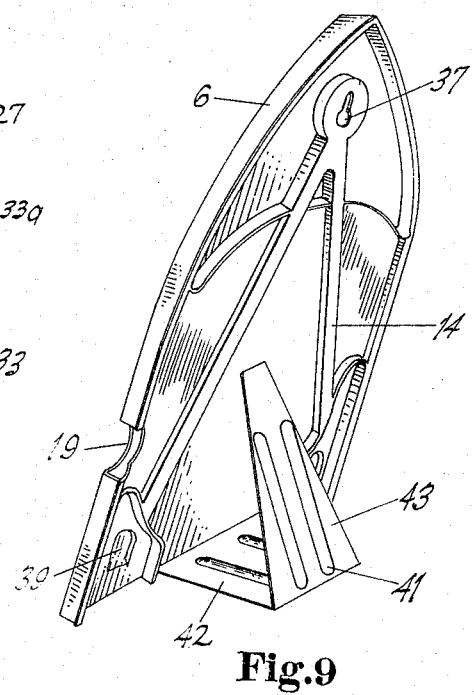
FIGURE 9 is a perspective view from the rear of the holder illustrating the manner in which the standard is associated with the holder.
Figure 8:
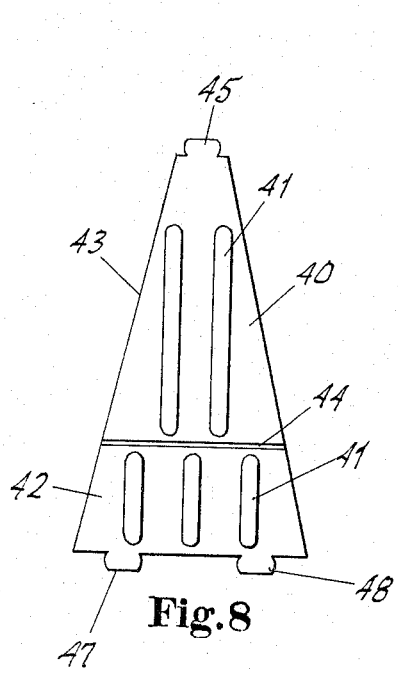
FIGURE 8 is a plan view of a standard by means of which the holder may be maintained in upright position.

As should now be apparent, by the selective arrangement of the insert panels, the user may match the colors and thereby follow each of the series of prayers in the rosary. The two insert panels may be retained at all times in the holder and hence the guide is wholly self-contained. Consequently, it is not necessary for the user to keep track of spare insert panels which could not be contained within the holder when in use. If it is desired to hang the holder on a wall surface, this may be conveniently done by means of the slot 37 (see FIGURE 4) formed in the base of the holder; and to insure that the insert panels will not slip from the pocket 8 when so used, it is preferred to provide the base 7 with a pair of tongues 38 and 39 which are struck from the lands 15a and 15b of the base, the tongues projecting upwardly into the slot 38 and serving as a means for frictionally engaging the insert panels so as to hold them in place. When it is desired to stand the holder on a table or the like, this may be conveniently done by means of the stand forming member 40 illustrated in FIGURE 8 which may be formed from plastic material suitably reinforced by means of integral ribs 41. In the embodiment illustrated, the stand is divided into a base portion 42 and a brace portion 43 hingedly connected together along a line of fold 44. A locking tongue 45 at the upper end of the stand is adapted to be engaged in a slot 46 in the base portion of the holder (see FIGURE 4) and similarly the tongues 47 and 48 at the bottom end of base portion 42 are adapted to be engaged in slots 49 and 50 in the base of the holder. This permits the holder to be positioned upright on a supporting surface in the manner illustrated in FIGURE 9.

Modifications may be made in the invention without departing from its spirit and purpose. It will be evident, for example, that the color coding may be of any desired color combinations which will be distinguishable to the viewer; and of course the size and shape of the various openings do not constitute a limitation on the invention. As has already been pointed out, the holder itself as well as the inserts and the rotatable disk may be formed from diverse materials; and of course both the decorative effects on the holder itself and the printed indicia on the inserts and disk do not constitute a limitation on the invention.

The embodiments of the invention in which an exclusive property or privilege is claimed are defined as follows:

1. A rosary guide, comprising a first panel having a flanged edge at its periphery, a second panel having a shoulder at its periphery and adapted to receive said flange to thereby define a pocket for receiving a panel insert, means along at least one common edge of said panels for access to said pocket, a rotatable disk mounted on said second panel and spaced between said first and second panels, said disk arranged with indicia thereon representing each of the five titles of each of the three Mysteries of the rosary prayers, a first opening in said first panel overlying said disk and of a size to selectively expose indicia of a given Mystery and its five titles when rotated, a series of ten spaced apart openings in said first panel and spaced outwardly from said first opening, a removable and reversible insert received in said pockets in a first position, said insert panel having at least one opening therein adapted to coincide with at least a portion of the opening in said first panel, whereby said insert panel masks a portion of the indicia containing area of said rotatable disk otherwise visible through the opening in said first panel.

2. The rosary guide claimed in claim 1 wherein said insert panel is received in a second position whereby a second opening therein is adapted to coincide with the first opening in said first panel when said insert panel is reversed, said second opening being smaller than the first opening in said first panel and oriented so as to mask from view a different portion of said printed indicia on said rotatable disk.

3. The rosary guide claimed in claim 2 including a second insert panel having an opening therein of the same size as the opening in said first panel positioned to coincide therewith, whereby when said second insert panel is positioned intermediate said first insert panel and said first panel a portion of said first insert panel will be exposed to view through the coinciding openings in said first panel and said second insert panel.

4. The rosary guide claimed in claim 3 wherein said insert panels and said rotatable disk are color coded so that the areas of the disk exposed by the openings in said insert panels will correspond to areas of the insert panels exposed through the opening in said first panel.

5. The rosary guide claimed in claim 4 wherein the areas of the insert panels exposed through said ten spaced openings are color coded so as to correspond with the areas of the rotatable disk exposed through the openings in said insert panels and the first named opening in said first panel.

References Cited by the Examiner

UNITED STATES PATENTS

| | | | |
|---|---|---|---|
| 1,805,520 | 5/1931 | Grumbacher | 35—28.5 |
| 2,166,372 | 6/1939 | Roeder | 235—89 |
| 2,238,866 | 4/1941 | Roberts | 35—28.5 |
| 2,629,185 | 2/1953 | Murlane | 35—28.3 |
| 2,657,610 | 11/1953 | Carran | 235—70 |
| 2,665,503 | 1/1954 | Miller | 35—28.3 |
| 2,714,844 | 8/1955 | Heidecke | 116—133 |
| 2,832,252 | 4/1958 | Gabriel | 235—70 |
| 3,027,073 | 3/1962 | Handelman | 116—133 |

LOUIS J. CAPOZI, *Primary Examiner.*